H. C. JENKINS.
PERISCOPE.
APPLICATION FILED DEC. 27, 1915.
1,309,478.
Patented July 8, 1919.
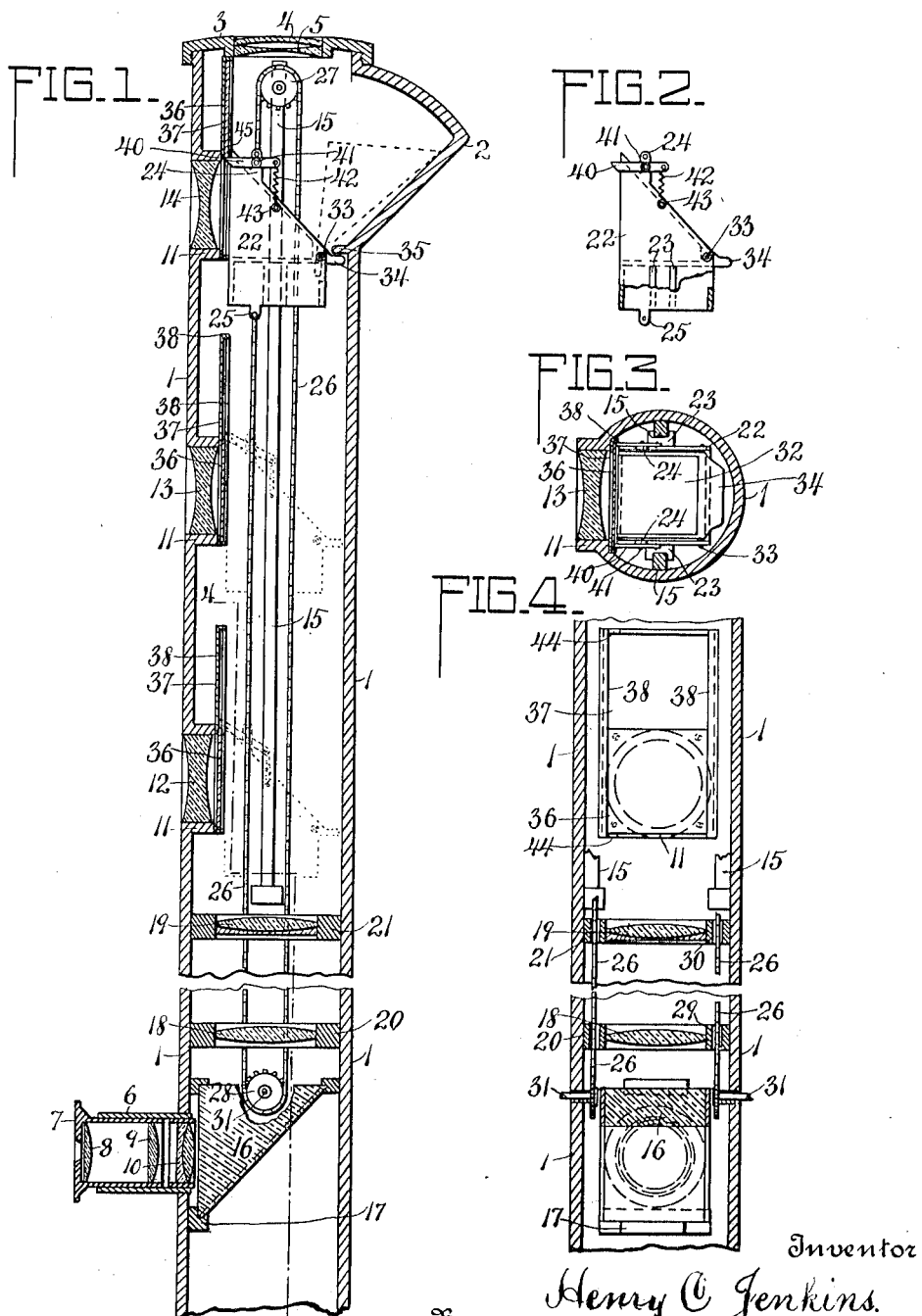
Inventor
Henry C. Jenkins.
By Geo. L. Wheelock,
Attorney

UNITED STATES PATENT OFFICE.

HENRY C. JENKINS, OF NEW YORK, N. Y., ASSIGNOR TO NEWELL & NEAL, OF NEW YORK, N. Y., A FIRM COMPOSED OF EMERSON R. NEWELL AND CHESTER T. NEAL.

PERISCOPE.

1,309,478. Specification of Letters Patent. Patented July 8, 1919.

Application filed December 27, 1915. Serial No. 68,639.

*To all whom it may concern:*

Be it known that I, HENRY C. JENKINS, a citizen of the United States of America, and a resident of New York, in the county of and State of New York, have invented certain new and useful Improvements in Periscopes, of which the following is a description, reference being had to the accompanying drawings, which form a part of this specification.

My invention relates to periscopes, especially to those designed for use as submarine periscopes, and the object of my invention is to improve the construction and arrangement of such devices in such a manner that they may have a wider range of use and operate to better advantage.

My invention consists essentially in providing a periscope of the tube type, with a plurality of focusing lenses, negative or positive, of different powers of concentration or diffusion, one of which may be a sky lens, and a movable or adjustable reflecting surface, adapted to cooperate with one or more of the lenses, to produce an image on a prismatic reflecting lens or mirror visible in a convenient position to be observed.

The particular arrangement of the several lenses is subject to variation without departing from the spirit of my invention. I regard my invention as generic in scope and the illustrations are to be considered as more or less diagrammatic, only such details being shown as appear necessary to a proper understanding of the invention.

In the drawings, Figure 1 is a vertical section of a periscope head or tube illustrating one form of my invention, embodying three sea or side lenses and one top or sky lens, parts being shown in elevation for the sake of clearness.

Fig. 2 is a detail of a carrier for one form of movable or adjustable prism lens or reflector.

Fig. 3 is a transverse section of the periscope tube just above a prism carrier and through a sea or side lens and its shutter.

Fig. 4 is a vertical section of a part of the periscope tube taken at right angles to the illustration Fig. 1, and approximately on the line 4—4 of Fig. 1.

1 is the periscope tube or casing having a side enlargement 2 near its upper end, a cap 3 on its upper end, provided with a socket for a protective glass 4 and a sky lens 5, an eye tube 6 near its lower end, fitted with suitable adjustable eye piece 7, and lenses 8, 9 and 10, a series of sockets 11 adapted to receive sea or side lenses 12, 13 and 14, and a pair of longitudinal guides 15. Convenience, expediency and economy will determine the number of parts necessary or desirable to construct the tube, cap, sockets and guides.

In a convenient position with respect to the eyetube 6 is located a suitable lower reflecting prism or mirror 16, in a suitable frame 17. Above this are located collecting lenses 18 and 19, mounted in frames 21 and 20 respectively, for completing the optical system.

Mounted between the guides 15 and adapted to slide thereon is a carrier 22 provided with cleats 23 to preserve its alinement. The carrier 22 is provided with attaching ears 24 and 25 for receiving the ends of sprocket chains 26, which chains pass around sprockets 27 near the upper end of the tube and sprockets 28 near the lower end of the tube and serve as means to raise and lower the carrier 22, the chains passing through holes 29 and 30 in the lens frames 20 and 21 respectively. Movement may be imparted to the sprockets 28 through shafts 31 from suitable driving means.

Supported in the upper part of the carrier 22 is a suitably framed reflecting prism 32, pivoted to the carrier at 33, the prism frame being provided with a projection 34 adapted to contact with the projection 35 on the tube, thereby to throw the prism frame and prism into the position shown in dotted lines in Fig. 1, whereby it rests in the enlargement 2 out of the line of vision between the sky lens 5 and the reflecting lens or mirror 16 and other lenses 18 and 19, in which position a view of the sky may be obtained through the eye piece 7.

Each of the sea or side lenses is provided with a shutter 36, mounted in a suitable frame 37, which in the present instance is a suitably secured sheet metal plate bent along its edges in a return bend 38 to confine the sliding shutter 36.

On the prism carrier 22 are mounted one or more shutter lifting fingers 40, pivoted at 41, and held in operative position to engage the shutters 36 by spring 42 secured at 43 to the carrier 22.

As the carrier 22 is raised by the chains 26 these fingers 40 pass through orifices 44 in the lower edge of a shutter frame plate, contact with the lower edge of a shutter and raise the shutter to uncover or disclose a side lens to the prism 32 mounted in the carrier 22, the fingers being so located that the shutter is clear of a side lens when the prism is directly opposite a side lens. The lowering of the carrier 22 from this position permits the shutter to close, and the raising of the carrier 22 causes the spring 42 to yield and the finger to dip and pass the shutter, permitting the shutter to drop and close the side lens from view. When returning from a position above a shutter, the fingers 40 yield in the opposite direction to pass the shutter. When raised beyond a position where it registers with the uppermost sea or side lens, the prism 32 is flopped over into the enlargement 2 of the tube, by the projection 34 encountering the projection 35 as heretofore stated, and the fingers 40 encounter a stop 45 of any suitable pattern, causing them to dip and release the shutter of the uppermost sea or side lens, allowing the shutter to drop.

By this arrangement, the tube contains no interfering lights at any time, and the adjustment of the parts is effected from below.

Having thus described my invention the following is what I claim as new therein and desire to secure by Letters Patent:

1. In an optical instrument, a tube having an eye piece, a plurality of side lenses spaced apart along the tube axis, successively operable shutters for said lenses, a light-deflector movable axially of said tube and arranged to register with said lenses successively, and means arranged selectively to open and close said shutters in accordance with the position of said deflector.

2. In an optical instrument, a tube having an eye piece, a plurality of side lenses spaced apart along the tube axis, successively operable shutters for said lenses, a light-deflector movable axially of said tube and arranged to register with said lenses successively, means arranged selectively to open and close said shutters in accordance with the position of said deflector, a sky lens, and means arranged to move said deflector out of the light-range from said sky lens.

HENRY C. JENKINS.